United States Patent
Peled et al.

(10) Patent No.: US 8,886,895 B2
(45) Date of Patent: Nov. 11, 2014

(54) SYSTEM AND METHOD FOR FETCHING INFORMATION IN RESPONSE TO HAZARD INDICATION INFORMATION

(75) Inventors: Itay Peled, Herzelia (IL); Moshe Anschel, Kfar-Saba (IL); Jacob Efrat, Kfar-Saba (IL); Alon Eldar, Ra'anana (IL); Ziv Zamsky, Ra'anana (IL)

(73) Assignee: Freescale Semiconductor, Inc., Austin, TX (US)

( * ) Notice: Subject to any disclaimer, the term of this patent is extended or adjusted under 35 U.S.C. 154(b) by 2935 days.

(21) Appl. No.: 10/940,121

(22) Filed: Sep. 14, 2004

(65) Prior Publication Data

US 2006/0059312 A1    Mar. 16, 2006

(51) Int. Cl.
*G06F 12/02* (2006.01)
*G06F 12/08* (2006.01)

(52) U.S. Cl.
CPC ........ *G06F 12/0859* (2013.01); *G06F 12/0862* (2013.01)
USPC ............ 711/156; 711/133; 711/137; 711/142

(58) Field of Classification Search
USPC .................................. 711/133, 137, 142, 156
See application file for complete search history.

(56) References Cited

U.S. PATENT DOCUMENTS

| | | | |
|---|---|---|---|
| 4,853,846 A | 8/1989 | Johnson et al. | |
| 5,206,822 A * | 4/1993 | Taylor | 708/607 |
| 5,553,265 A * | 9/1996 | Abato et al. | 711/143 |
| 5,737,751 A * | 4/1998 | Patel et al. | 711/133 |
| 5,742,790 A | 4/1998 | Kawasaki | |
| 5,828,860 A * | 10/1998 | Miyaoku et al. | 712/207 |
| 5,903,911 A | 5/1999 | Gaskins | |
| 6,081,873 A | 6/2000 | Hetherington et al. | |
| 6,272,597 B1 | 8/2001 | Fu et al. | |
| 6,275,903 B1 * | 8/2001 | Koppala et al. | 711/132 |
| 6,799,265 B1 * | 9/2004 | Dakhil | 712/217 |
| 6,868,491 B1 * | 3/2005 | Moore | 712/225 |
| 6,970,978 B1 * | 11/2005 | Wu | 711/137 |
| 2002/0069326 A1 | 6/2002 | Richardson et al. | |
| 2004/0030839 A1 * | 2/2004 | Southwell et al. | 711/137 |

* cited by examiner

*Primary Examiner* — Arpan P. Savla

(57) ABSTRACT

A method for fetching information in response to hazard indication information, the method includes: (i) associating hazard indication information to at least one information unit that is being fetched to the cache module; (ii) receiving a request to perform a fetch operation; and (iii) determining whether to fetch at least one information unit to the cache module in response to the hazard indication information and in response to dirty information associated with the at least one information unit.

22 Claims, 9 Drawing Sheets

SYSTEM AND METHOD FOR FETCHING INFORMATION IN RESPONSE TO HAZARD INDICATION INFORMATION

FIELD OF THE INVENTION

The present invention relates to methods and systems for fetching information in response to hazard indication information, and especially to methods and apparatuses for retrieving data at a cache module that supports speculative fetch and write through policy.

BACKGROUND OF THE INVENTION

Cache modules are high-speed memories that facilitate fast retrieval of information including data and instructions. Typically, cache modules are relatively expensive and are characterized by a small size, especially in comparison to higher-level memory modules.

The performance of modern processor-based systems usually depends upon the cache module performances and especially to a relationship between cache hits and cache misses. A cache hit occurs when an information unit that is present in a cache module memory is requested. A cache miss occurs when the requested information unit is not present in the cache module and has to be fetched from a another memory that is termed a higher-level memory module.

Various cache module modules and processor architectures, as well as data retrieval schemes, were developed over the years, to meet increasing performance demands. These architectures included multi-port cache modules, multi-level cache module architecture, super scalar type processors and the like.

The following U.S. patents and patent applications, all being incorporated herein by reference, provide a brief summary of some state of the art cache modules and data fetch methods: U.S. Pat. No. 4,853,846 of Johnson et al., titled "Bus expander with logic for virtualizing single cache control into dual channels with separate directories and prefetch for different processors"; U.S. patent application 20020069326 of Richardson et al., titled "Pipelines non-blocking level two cache system with inherent transaction collision-avoidance"; U.S. Pat. No. 5,742,790 of Kawasaki titled "Detection circuit for identical and simultaneous access in a parallel processor system with a multi-way multi-port cache"; U.S. Pat. No. 6,081,873 of Hetherington et al., titled "In-line bank conflict detection and resolution in a multi-ported non-blocking cache"; U.S. and U.S. Pat. No. 6,272,597 of Fu et al., titled "Dual-ported, pipelined, two level cache system".

Processors and other information requesting components are capable of requesting information from a cache module and, alternatively or additionally, from another memory module that can be a higher-level memory module. The higher-level memory module can also be a cache memory, another internal memory and even an external memory.

There are various manners to write information into a cache module or a higher-level memory module. Write-through involves writing one or more information units to the cache module and to the higher-level memory module substantially simultaneously. Write-back involves writing one or more information units to the cache module. The cache module sends one or more updated information units to the high-level memory once that one or more updated information units are removed from the cache. The latter operation is also known in the art as flushing the cache.

Some prior art cache modules include multiple lines that in turn are partitioned to segments. Each segment is associated with a validity bit and a dirty bit. A valid bit indicates whether a certain segment includes valid information. The dirty bit indicates if the segment includes valid information that was previously updated but not sent to the higher-level memory module. If a write back policy is implemented only the segments that are associated with an asserted dirty bit are written to the high-level memory module.

Some prior art cache modules perform mandatory fetch operations and speculative fetch operations. The latter are also known as pre-fetch operations. A mandatory fetch operation involves fetching an information unit that caused a cache miss. The speculative fetch operations are aimed to reduce cache miss events, and replace not-valid segments with valid segments.

When applying both speculative fetch operations and write-through policy the high-level memory module can replace an updated segment residing in the cache memory with a non-updated segment.

There is a need to provide an efficient method and apparatus for fetching information to a cache module.

SUMMARY OF THE PRESENT INVENTION

The invention utilizes hazard indication information to prevent a replacement of an updated segment of information residing in a cache memory with a non-updated segment that is speculatively fetched from another memory. Conveniently, hazard indication information indicates that the cache includes updated information that was not yet sent to another memory, so that it is not replaced by speculatively fetched information from that memory.

An apparatus for fetching information in response to hazard indication information, the apparatus includes: (i) a cache module; (ii) hazard indication logic for associating hazard indication information to at least one information unit that is being fetched to the cache module; and (iii) a controller, coupled to the hazard information logic and to the cache module, for initiating a fetch operation in response to the hazard indication information and in response to dirty information associated with the at least one information unit.

A method for fetching information in response to hazard indication information, the method includes: (i) fetching to the cache module, from another memory module, a first information unit; (ii) initiating a process of writing an updated information unit to the cache module and to a other memory module and updating hazard indication information to reflect a progress of the writing process to the second memory; (iii) receiving a request to retrieve the updated information unit; and (iv) retrieving the updated information unit in response to the hazard indication information.

A method for fetching information in response to hazard indication information, the method includes the stages of: (i) associating hazard indication information to at least one information unit that is being fetched to the cache module; (ii) receiving a request to perform a fetch operation; and (iii) determining whether to fetch at least one information unit to the cache module in response to the hazard indication information and in response to dirty information associated with the at least one information unit.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following description related to data fetch operations and to a data cache module. Those of skill in the art will appreciate that the disclosed systems and methods can be applied mutates mutandis to instruction retrieval, instruction cache module, and even to a combination of data and instruction retrieval and to cache modules that store both instructions and data.

According to an embodiment of the invention hazard indication information is associated with information units, such as Basic Information Units (BDUs), that are being fetched. Once a new fetch operation is requested the hazard indication information and dirty information are examined to determine whether to fetch one or more data information units. Thus, the method and system facilitate aborting fetch operations if the hazard indication information indicates that data mismatch can occur.

According to an embodiment of the invention there is no need to block speculative fetch operations of information units that belong to a partially valid line of information units. There is no need to block speculative fetching operations of valid information units, thus increasing the efficiency and throughput of the speculative fetch operations.

Figure 1:
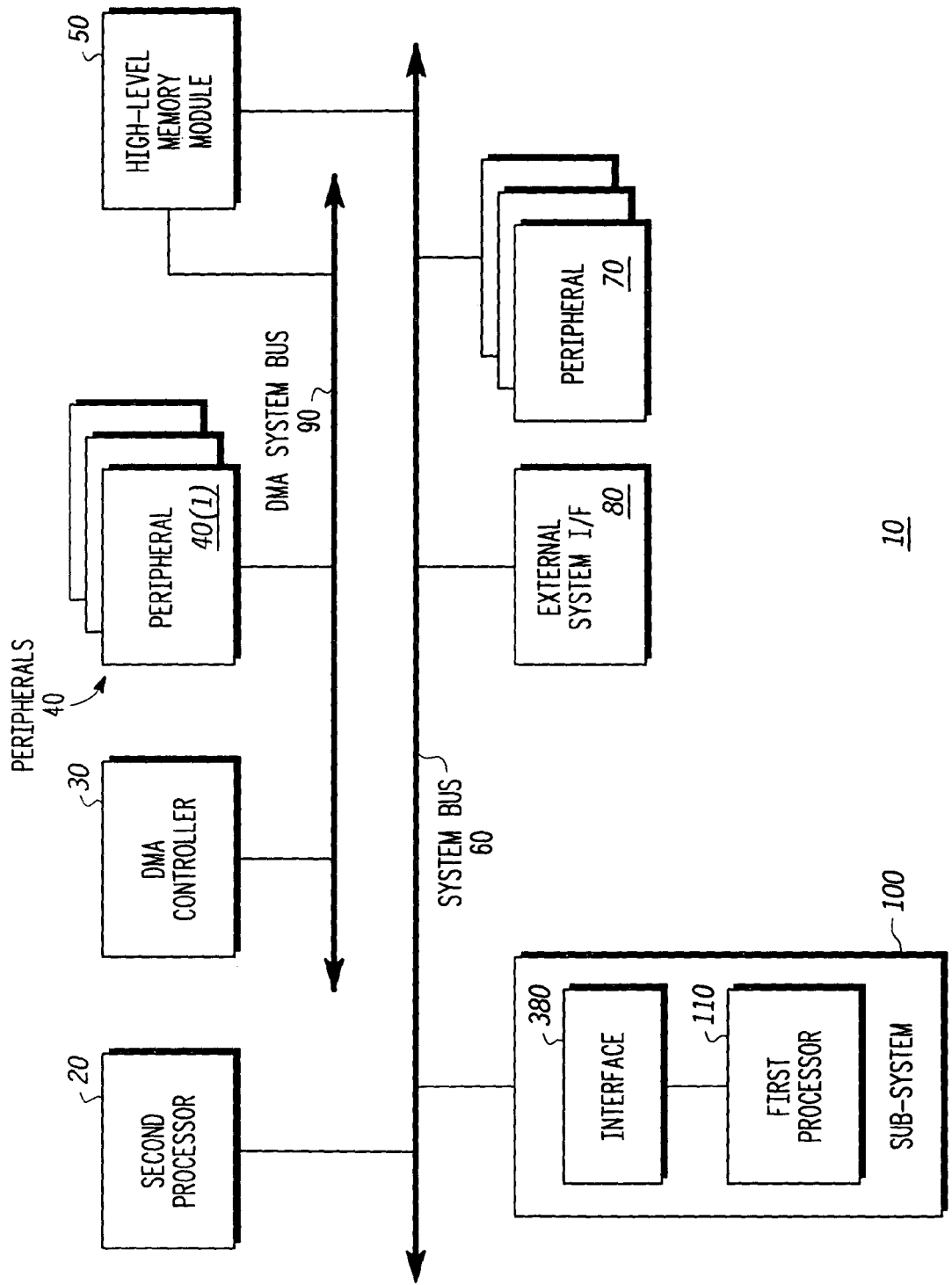
FIG. 1 is a schematic diagram of an apparatus, according to an embodiment of the invention.

FIG. 1 illustrates an apparatus 10 according to an embodiment of the invention. Apparatus 10 includes a sub-system 100 that in turn includes a first requesting component such as first processor 110 and also includes a multi-port data cache module (denoted 200 in FIG. 2). Apparatus 10 further includes a system bus 60 that is connected to: (i) a second requesting entity such as second processor 20, (ii) high-level memory module 50, (iii) sub-system 100, (iv) peripherals 70, and (v) an external system I/F 80.

The high-level memory module 50 is an example of another memory module that is accessible by processor 110. It usually stores programs and data for the various processors. It can also be a second level cache memory module supporting off-chip memories, but this is not necessarily so. If a cache miss occurs the data can be fetched from the high-level memory module 50 or from other memory modules.

System bus 60 is connected to sub-system 100, via a gasket (also referred to as interface) 380. Various fetch operation utilize interface 380.

Apparatus 10 also includes a DMA system bus 90 that is connected to a DMA controller 30, to multiple peripherals 40 and to the shared memory module 370, via DMA interface 382. The DMA system bus 90 can be used by external components, such as processor 20 to access the shared memory module 370.

Figure 2:
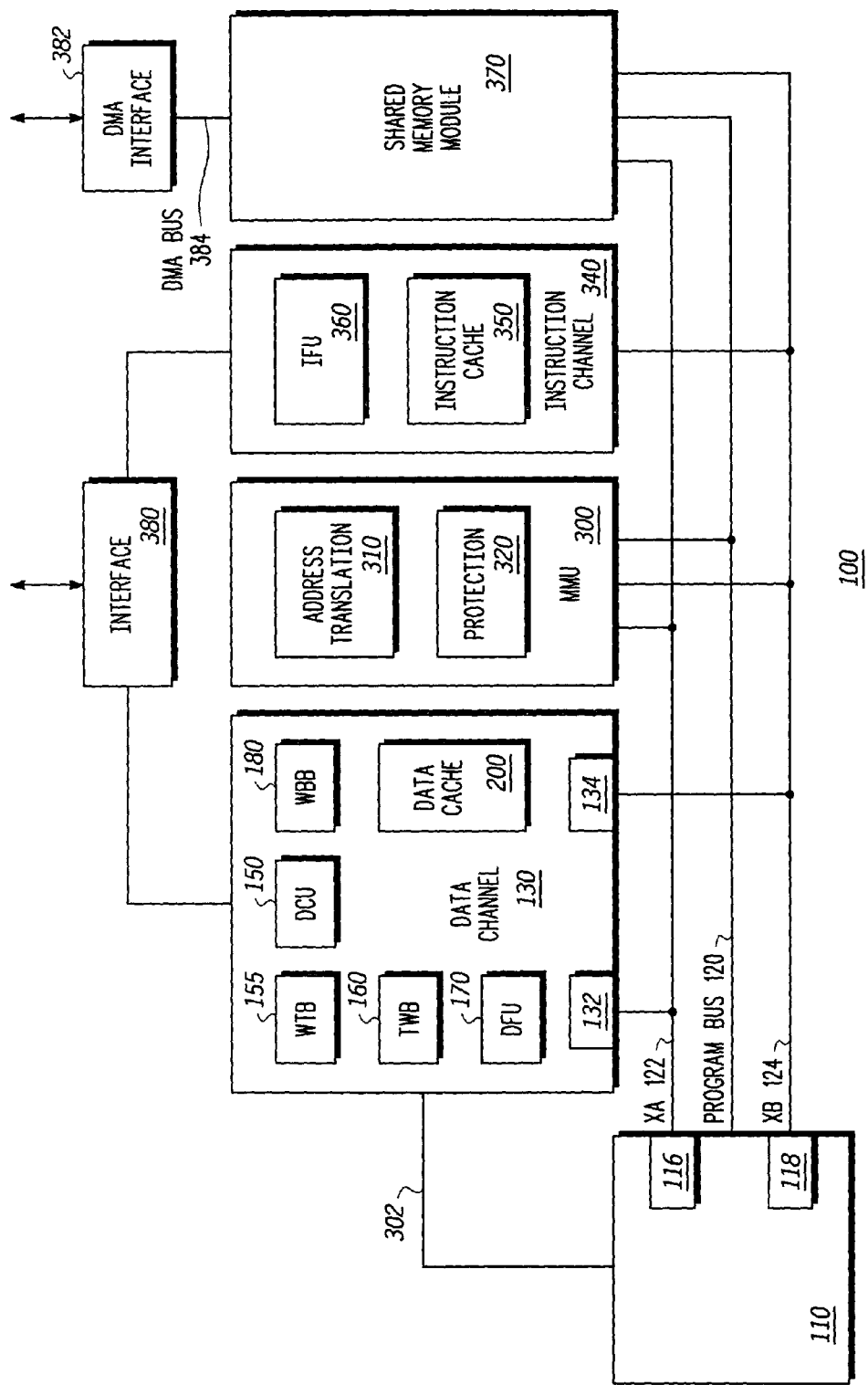
FIG. 2 is a schematic diagram of a sub-system, according to an embodiment of the invention.

FIG. 2 illustrates a sub-system 100 of apparatus 10, according to an embodiment of the invention. Sub-system 100 includes a processor 110, a data channel 130, a Memory Management Unit (MMU) 300, an instruction channel 340, a level-one RAM memory 370 as well as an interface unit 380.

Processor 110 and the instruction channel 340 are connected to program bus 120. The instruction channel 340 includes an instruction cache module 350 and an Instruction Fetch Unit (IFU) 360 that is responsible for instruction fetching and pre-fetching for the instruction cache module 350.

Processor 110 has a first data port 116 and a second data port 118. The first data port 116 is connected, via first data bus (XA) 122 to a first port 132 of the data channel 130, to the MMU 300 and to the level-one RAM memory 370. The second data port 118 is connected, via second data bus (XB) 124 to a second port 134 of the data channel 130, to the MMU 300 and to the level-one RAM memory 370. Processor 110 is capable of generating two data addresses per cycle.

The data channel 130 is connected, via data fetch bus 126, to an interface 380 that in turn is connected to one or more additional memories such as the high-level memory 50. Additional memories can be a part of a multi-level cache architecture, whereas the data cache module 200 is the first level cache module and the other memories are level two cache memories. They can also be a part of an external memory that is also referred to as a main memory.

MMU 300 includes a hardware protection unit 320 for supplying program and data hardware protection, and a translation unit 310 for high-speed virtual address to physical address translation. MMU 300 is also capable of providing various cache and bus control signals. The virtual address is an address that is generated by processor 100 and as viewed by code that is executed by processor 110. The physical address is used to access the various memory banks.

Data channel 130 includes a data cache module 200, and multiple supporting units such as Write Through Buffer (WTB 155), Trace Write Buffer (TWB) 160, a Data Fetch Unit (DFU) 170, a Write Back Buffer (WBB) 180 and Data Control Unit (DCU) 150. TWB 160 temporarily saves trace data. DFU 170 is responsible for data fetching and pre-fetching. Data fetching operations can include mandatory fetching operations and speculated fetching operations. Mandatory fetching operations include retrieving a data unit that caused a cache miss. Speculated fetching (also termed pre-fetching) operations include retrieving data units that did not cause a cache miss. Usually this latter type of data is expected to be used soon after the pre-fetch. This expectation is usually based on an assumption that many data requests are sequential in nature.

It is assumed that each fetch operation involves fetching a single basic data unit (BDU). Accordingly, a BDU that is fetched during a mandatory fetch operation is referred to as a mandatory BDU and a BDU that is fetched during a speculated fetch operation is referred to as a speculated BDU. It is further noted that the size of BDU can depend upon the memory module from which it is initially fetched, but for simplicity of explanation it is assumed that all the BDUs have the same size.

WBB 180 temporarily saves data written into the main memory in a write-back operation. Write back operation occurs when data that was previously written into the data cache module 200 is replaced.

Processor 110 is capable of issuing two data requests simultaneously, via buses XA 122 and XB 124. The data channel 130 processes these requests to determine if one or more cache hit occurred. Basically, the data channel 130 can decide that the two data requests resulted in a cache hit, the both request resulted in a cache miss or that one request resulted in a cache hit while the other resulted in a cache miss.

According to an embodiment of the invention processor 110 is stalled until it receives all the data it requested, but this is not necessarily so. For example, according to another embodiment of the invention, only portions of the processor are stalled.

There are various manners for starting and ending the stalling stage. A cache miss can trigger entrance to such a stage. It is assumed that processor 110 enters a stalled stage once it receives a cache miss indication from data channel 130. Processor 110 exits the stall stage once it receives an indication from the data channel 130 that the requested data is available. Line 302, connecting between processor 110 and data channel 130 conveys a stall signal that can cause processor 110 to enter a stalled stage and exit such a stage.

Figure 3:
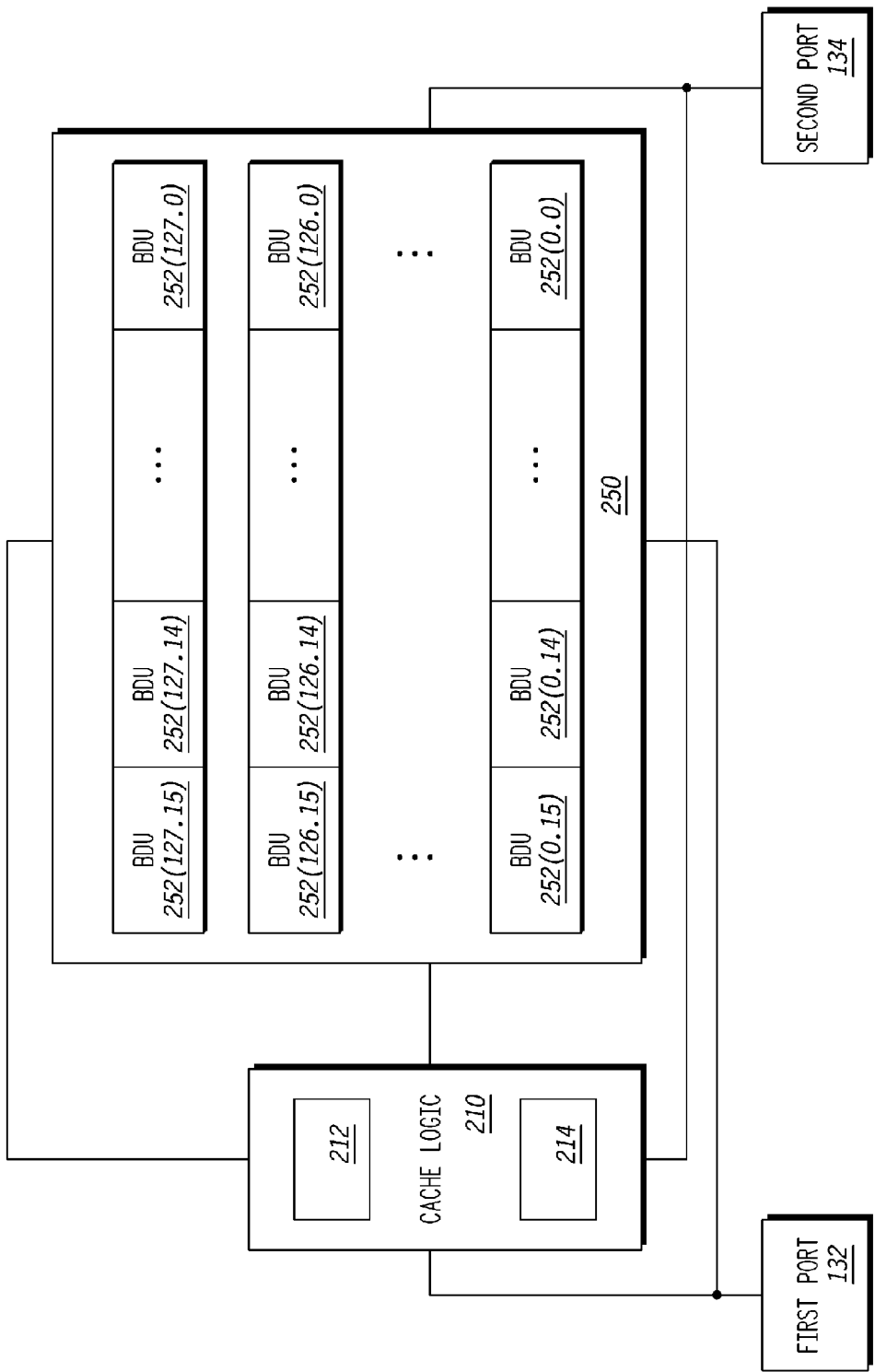
FIG. 3 is a schematic illustration of a data cache module, according to an embodiment of the invention.

FIG. 3 is a schematic illustration of data cache module 200, according to an embodiment of the invention. Data cache module 200 includes logic, such as cache logic 210 and cache memory bank 250. The cache memory bank 250 includes one hundred and twenty eight lines 250(0)-250(127), each line includes sixteen 128-bit long basic data units. These basic data units (BDUs) are denoted 252(0,0)-252(127,15). A cache hit or cache miss is determined on a BDU basis. It is noted that the logic can be located outside the cache module, but this is not necessarily so.

Figure 4:
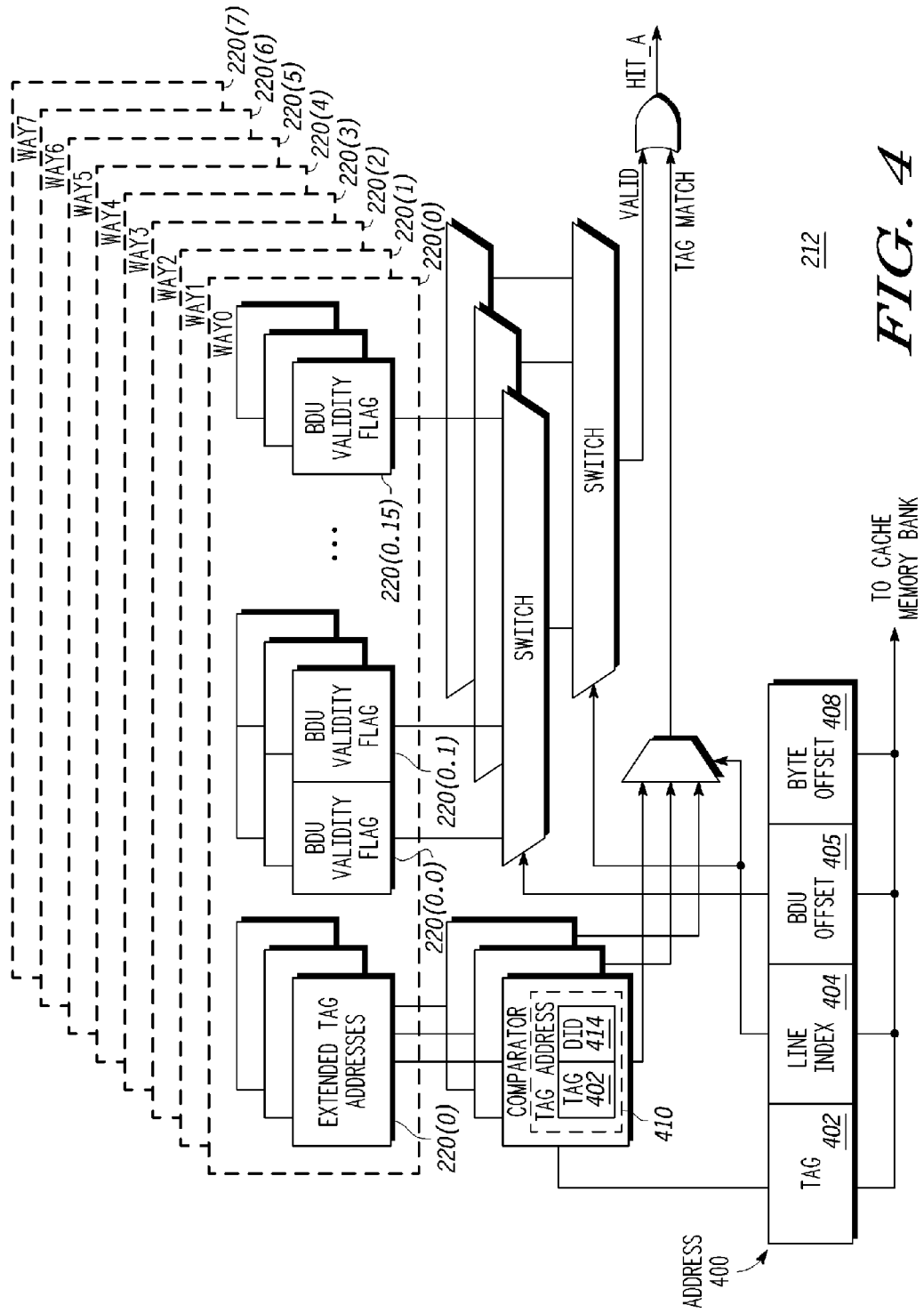
FIG. 4 is a schematic illustration of cache logic, according to an embodiment of the invention.

FIG. 4 is a schematic illustration of cache logic 210, according to an embodiment of the invention. The cache logic 210 is capable of managing two data requests simultaneously and includes two identical portions, 212 and 214, each is capable of determining whether a single cache hit or cache miss has occurred. For simplicity of explanation only a first portion 212 of the cache logic 210 is illustrated in detail.

The cache logic 210 includes eight ways denoted WAY0-WAY7 220(0)-220(7). Each way stores address and status information that is associated with sixteen lines. The address information includes a tag address and the status information includes BDU validity and update information. For simplicity of information only WAY0 220(0) is illustrated in detail, while the other ways are represented by boxes 220(1)-220(7).

Each line is associated with an extended tag value and with sixteen BDU validity bits, representative of a validity of each BUD within that line. WAY0 220 stores sixteen extended tag addresses 220(0)-220(15), as well as sixteen sets of sixteen BDU validity flags 220(0,0)-220(15,15).

Each BDU can also be associated with dirty bits that indicate if a BDU was modified without being written to the higher-level memory module.

Once processor 110 provides a address 400 over the first data bus XA 122 the first portion 212 of cache logic 210 processes this address to determine whether the requested data is stored at the cache module (cache hit) or not (cache miss). If a cache hit occurs the requested data is sent to processor 110 over an appropriate data bus out of XA 122 or XB 124. Else, the DFU 170 is notified about the cache miss.

Address 400 is partitioned to a 20-bit tag address 402 that includes the twenty most significant bits of address 400, a 4-bit line index 404, a BDU offset 405 and a 4-bit byte offset 408. The 4-bit byte offset is used for data retrieval from the cache memory bank 250. The cache module 200 can be addressed by virtual addresses, while the higher-level memory module is accessed by physical addresses. Accordingly, the MMU 300 performs address translation only when BDUs are fetched from the high-level memory module 50.

Each of the sixteen tag addresses 220(0)-220(15) stored within WAY0 220 is compared, in parallel, to an extended 28-bit tag address 410 that includes the 20-bit tag address 402 as well as an 8-bit DID 414. Those of skill in the art will appreciate that such a comparison takes place at all ways in parallel.

In addition, the BDU offset 408 and the 4-bit line index 404 are used to retrieve a validity flag that corresponds to the requested BDU. The 4-bit line index 404 is used for selecting a set of BDU validity flags out of the sixteen sets of WAY0, while the 4-bit BDU offset 408 is used for selecting a validity flag out of the selects set of BUD validity flags.

A cache hit occurs if there is a match between one of the stored tag addresses and the extended tag address and if the selected BDU is valid.

DFU 170 receives an indication of a cache hit and a cache miss. If both data requests resulted in a cache hit the DFU 170 is not required to perform a mandatory fetch. If only one of the data requests resulted in a cache miss the DFU 170 is required to perform a single mandatory fetch. If both data requests resulted in a cache miss the DFU 170 is required to perform one or more mandatory fetches.

According to an embodiment of the invention DFU 170 receives fetch characteristics that may affect the mandatory fetch operations. The fetch characteristics may include the size of a data that can be retrieved at a single fetch operation, the size of fetch bursts and the like.

These characteristics can reflect the size of buses on which data transfer occurs, the arrangement of external memory banks and the like. For example, a DRAM memory is typically arranged in DRAM rows. The content of a whole DRAM row can be fetched by a single fetch operation, thus fetching the content of a whole line can be useful. It is noted that sub-system 100 can be connected to multiple memory banks, via multiple buses, each having its own fetch characteristics.

Fetch bus 126 allows fetching a single BDU per fetch operation. A typical fetch burst includes four consecutive fetch operations, thus a total of four BDUs can be retrieved during a single fetch burst.

Typically, memory modules that are adapted to perform fetch burst are partitioned to fixed sized data unit sets. A fetch burst that includes a request to receive a certain data unit will amount in a retrieval of that set. The order of fetched data units depends upon the specific requested data set.

Sub-system 100 is configured in a manner that a fetch burst cannot be interrupted. Thus, if more than a single cache miss occurs simultaneously, there is a great benefit in retrieving more than one mandatory BDU during a single fetch burst. This efficient fetching scheme can reduce the processor stall period, especially as processor 110 is stalled until it receives both mandatory BDUs.

Once two cache miss events occur at the same time the DFU 170 has to determine if both mandatory BDUs can be fetched during a single fetch burst. If the answer is positive then such a fetch burst is initiated. Once the burst ends the mandatory BDUs are sent to processor 110, the processor 110 can exit the stall state.

Figure 5:
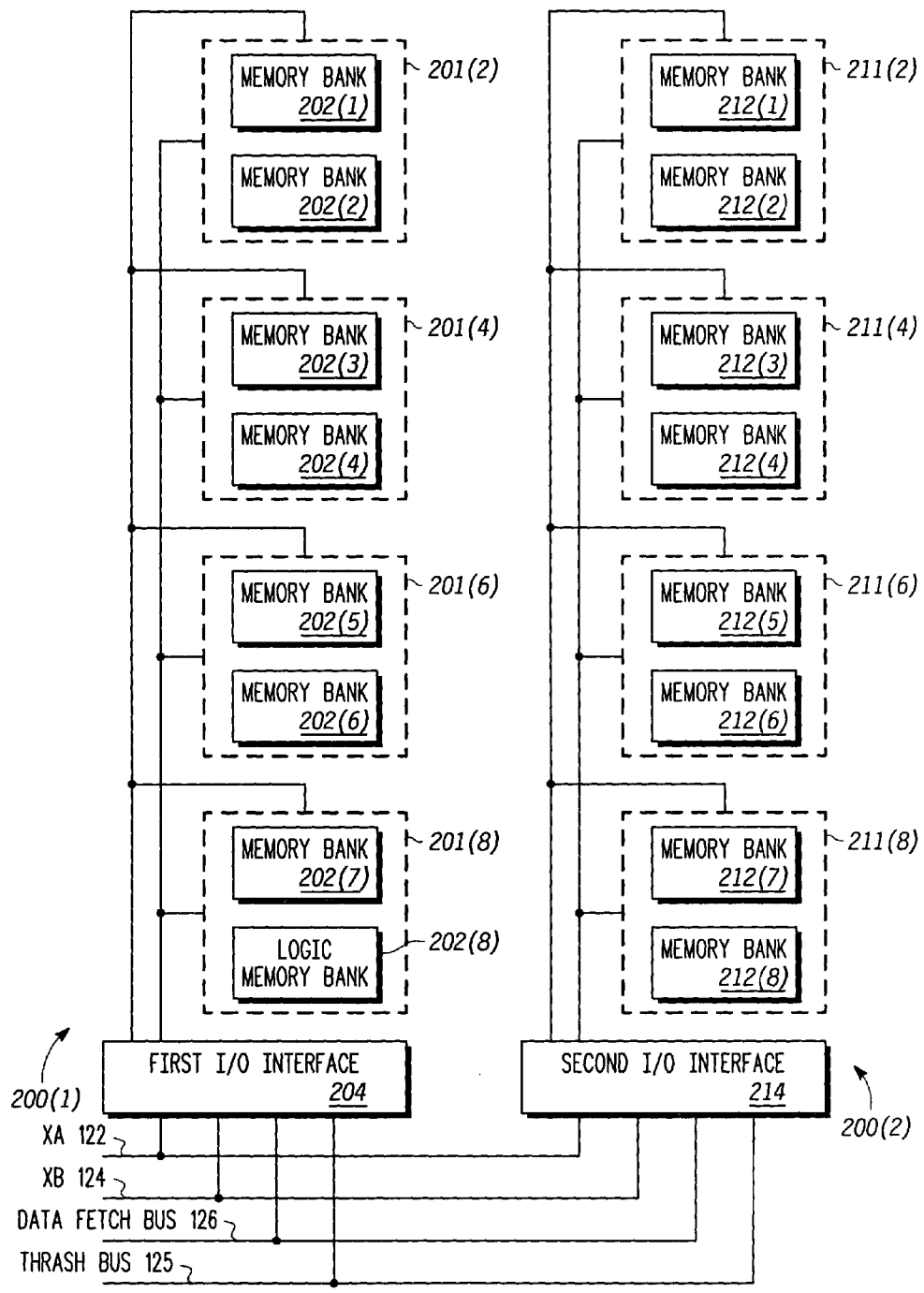
FIG. 5 is a schematic illustration of a structure of the data cache module, according to an embodiment of the invention.

FIG. 5 is a schematic illustration of the structure of the data cache module, according to an embodiment of the invention. FIG. 5 illustrates a data cache module 200 that includes a controller, although other configuration can be provided, such a configuration in which the controller is not a part of the data cache module. The data cache module can be connected to one or more controller.

The cache module 200 is divided to two groups 200(1) and 200(2). The first group 200(1) includes four memory banks

201(2), 201(4), 201(6) and 201(8), each bank including two virtual memory banks (202(1), 202(2)), (202(3), 202(4)), (202(5), 202(6)), and (202(7), 202(8)), respectively and a first I/O interface module 204.

The second group 200(2) includes four memory banks 211(2), 211(4), 211(6) and 211(8), each bank including two virtual memory banks (212(1), 212(2)), (212(3), 212(4)), (212(5), 212(6)), and (212(7), 212(8)), respectively and a second I/O interface module 214.

Each memory bank is arranged as an array that includes sixty-four 256-bit wide rows. The addresses of the four memory banks that form each group are interleaved to reduce memory contentions. The addresses of pairs of virtual memory banks that belong to the same memory bank are not interleaved.

The first I/O interface module 204 is connected in parallel, by two buses, to four memory banks 201(2)-201(8) and the second I/O interface module 214 is connected in parallel, by two buses, to memory banks 211(2)-211(8).

A data cache module 200, as well as sub-system 100 has a finite capability of managing simultaneous information transfers. For example, data cache module contention may occur when the module receives two simultaneous access requests to different addresses within the same virtual memory bank. The access requests can be a part of read or write operations. In such a case one of the access requests is serviced after the other. This may cause processor 110 to stall. The finite capability is also expressed by the need to arbitrate between various bus requests, as implemented by the DCU 150. It this case the core can also be stalled.

The data cache module 200, and especially the cache logi1 210, is connected to a controller, such as DFU 170, to provide indications about two cache events, by signals CACHE_A_HIT/MISS 201 and CACHE_B_HIT/MISS 203. The DFU 170 in turn may determine which fetch operations to execute and the like. The requests of the DFU 170, as well as requests from various supporting units, such as the WBB 180 to complete write back operations, and sent to DCU 150 that arbitrates between the various requests. These various components exchange fetch request and fetch acknowledgement signals. The CACHE_A_HIT/MISS 201 signal is asserted in response to an occurrence of a cache miss event associated with a request to retrieve data over the first data bass XA 122. This signal is negated when a corresponding cache hit event occurs. The CACHE_B_HIT/MISS 203 signal is asserted in response to an occurrence of a cache miss event associated with a request to retrieve data over the second data bass XB 124. This signal is negated when a corresponding cache hit event The data cache module 220 may also include buffering means connected to the first data bus XA 122, to the second data bus 124 and/or to the data fetch bus 126.

Figure 6:
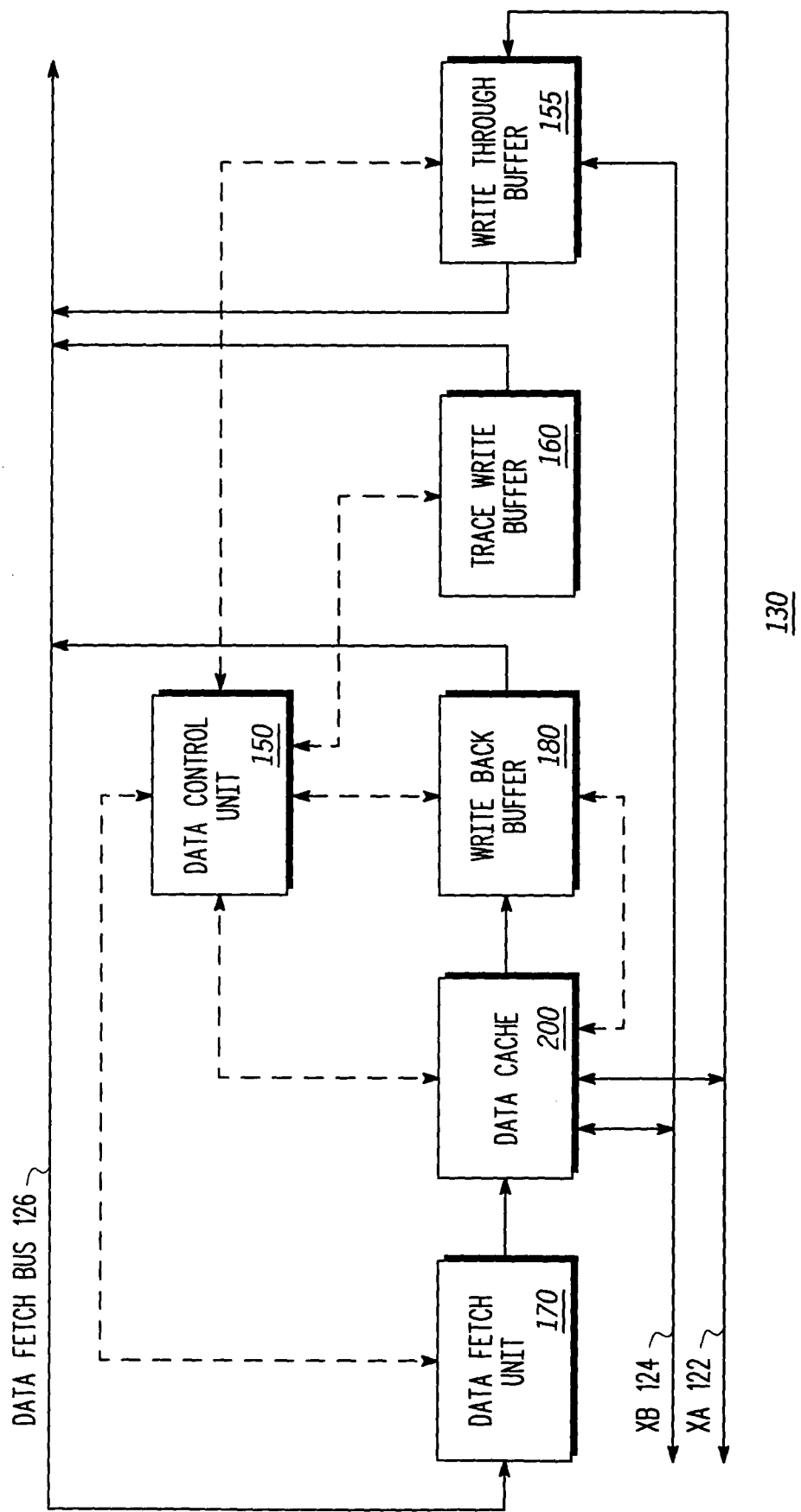
FIG. 6 is a detailed description of the data cache module, according to an embodiment of the invention.

FIG. 6 is a schematic illustration of various components of the data channel 130 according to an embodiment of the invention. The various components of the data channel 130, including data cache module 200, WTB 155, TWB 160, DFU 170 and WBB 180 can access a bus the is connected to other memory modules, such as high-level memory module 50, bus issuing bus requests to the DCU 150 that arbitrates between the bus requests.

The data cache module 200 is connected to a controller, such as DFU 170, that is connected to cache logic 210, to receive indications about two cache events, by signals CACHE_A_HIT/MISS 201 and CACHE_B_HIT/MISS 203.

CACHE_A_HIT/MISS 201 signal is asserted in response to an occurrence of a cache miss event associated with a request to retrieve data over the first data bass XA 122. This signal is negated when a corresponding cache hit event occurs. The CACHE_B_HIT/MISS 203 signal is asserted in response to an occurrence of a cache miss event associated with a request to retrieve data over the second data bass XB 124. This signal is negated when a corresponding cache hit event occurs.

The DFU 170 is capable of determining a fetching scheme that in turn can include mandatory fetch operations as well as speculative fetch operations. The speculative fetch operations associated with different mandatory information units can be interlaced, but this is not necessarily so.

WBB 180 has eight entries of 256-bit each, for storing up to sixteen BDUs at a time. It has an input bus and an output bus.

WBB 180 is adapted to receive information units from the cache module 200 and send the information units to the high-level memory module 50. WBB 180 has a limited buffering capabilities and is capable of separating between a reception of information units from the cache module 200 and between writing the information units to the high-level memory module 50. Usually, before new BDUs are written to the cache module 200 the cache module 200 automatically transfers BDUs that have a lower probability of being re-read (usually older BDUs). It is noted that a BDU can be cache-locked, meaning that it is not thrashed.

WBB 180 is capable of generating a high-priority bus request and a low priority-bus request for sending at least one information unit to the high-level memory module 50. High-priority bus requests are generated in various scenarios, such as a reception of a flush instruction, full or almost full WBB state, and possible WBB incoherency event. A flush instruction forces the entire content of the WBB 180 to be sent to the high-level memory module 50.

A WBB incoherency event may occur when a processor requests an information unit that is stored within WBB 180. This information was flushed from the cache module 200 thus it can cause a cache miss event. A mandatory fetch operation to retrieve that information unit can eventually send an obsolete information unit to the processor 110. Instead, once WBB 180 detects that such an event can occur it sends its content to the high-level memory module 50, waits until the high-level memory module 50 is updated, and allows the high-priority memory module 50 to send the updated information unit to the processor 110.

The WTB 155 facilitates write through operations. It includes four entries. It is connected to the first and second data buses XA 122 and XB 124. It also has an output data bus. It is adapted to receive a single entry at a time, thus two entries are written one after the other. It is capable of issuing high priority and low-priority bus requests. High-priority bus requests are issued of the WTB 160 is full or if the processor 110 is stalled until the write through operation is completed.

The processor 110 can execute various coherency related operations including address range invalidation, address range synchronization and address range flush. Address range invalidation may involve resetting the valid and dirty bits associated with the relevant BDUs.

According to an embodiment of the invention processor 110 may define the data memory policy for each cache memory set of lines. This cache memory set of lines may correspond to a way but this is not necessarily so. A cache write-back policy is conveniently applied to data that is to be re-used by a program. In such a case multiple write operations to the cache do not necessarily amount in multiple transaction to the high-level memory module 50. On the other hand, if there is a low probability that certain data segment will be re-used then the write through policy can be implemented.

There are various well-known manners to convey the data memory policy. It is assumed that the data memory policy is implemented by processor 110 that inserts appropriate values in a certain control register. MMU 300 in turn sends control signals that define the manner in which data unit is written to the data channel 130. Such a control register can include two bits that define if the data memory policy is cacheable write through, cacheable write back or non-cacheable write through. The MMU 300 in turn sends appropriate control signals to the various buffers and cache, including the WBB 180 and the WTB 155. The content of the certain control register may be varied, according to the cache memory set of line that is involved.

When applying a cacheable write back policy data that is written to the data cache module 200 is sent to the high-level memory module 50 only through the WBB 180. When applying cacheable write through policy processor 110 is not stalled, unless a hazard is detected, and data is written both to the data cache module 200 and to the WTB 155. Data is not written to the data cache module 200 until its corresponding DBU is valid. The processor 110 can be stalled when applying a non-cacheable write through policy. Those of skill in the art will appreciate that other data memory policies can be applied, without departing from the scope of the invention.

DCU 150 arbitrates between various bus requests initiated by various components of the data channel 130, including the DFU 170, the WTB 155, the TWB 160 and the WBB 180. DCU 150 can apply various well-known arbitration schemes. Usually, the DCU 150 will arbitrate between various bus requests according to the following priority: high-priority bus requests from the TWB 160; high-priority bus requests from the WBB 180; previous information unit bus requests from the WTB 155, mandatory fetch requests from the DFU 170; low-priority bus requests from the WTB 155; speculative fetch requests from the DFU 170 and finally low-priority bus requests from the WBB 180.

The data cache module 200 can further include fetch write buffers, as well as first and second data bus write buffers, for implementing a very short fetch and data retrieval pipe-line.

Figure 7:
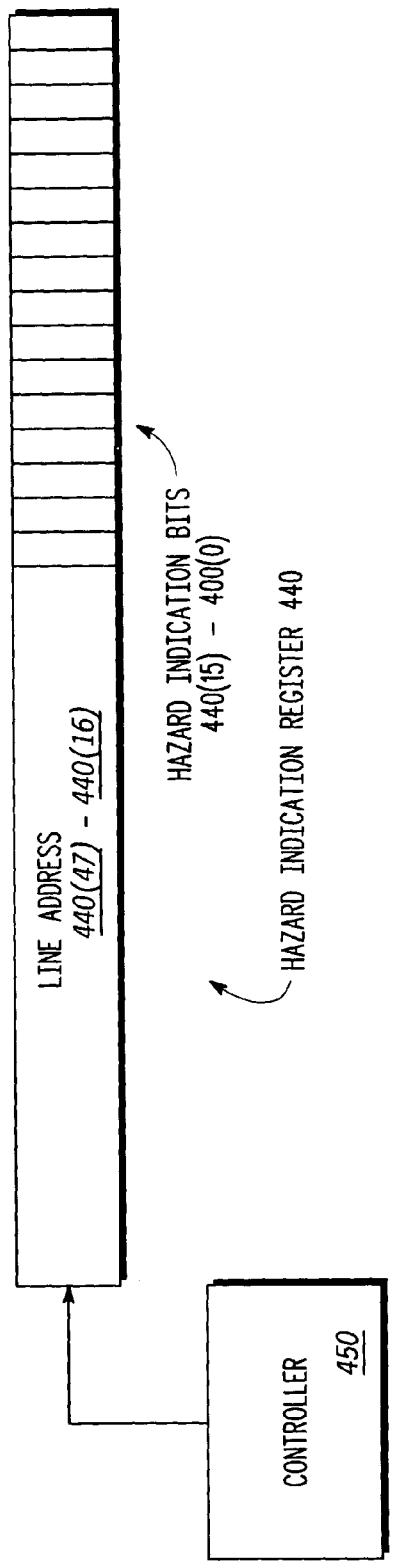
FIG. 7 is a schematic illustration of a hazard indication logic, according to an embodiment of the invention.

FIG. 7 is a schematic illustration of hazard indication logic 430, according to an embodiment of the invention. The hazard indication logic 430 includes at least one hazard indication register 440 that has a first portion that stores an address of a cache line of which one or more of its BDUs are being fetched. The hazard indication register 430 has a second portion for storing multiple hazard indication bits, each associated with a single BDU of that cache line. Multiple hazard indication registers can be allocated for tracking after multiple cache lines. The first portion includes bits 440(47)-430(16), while second portion includes bits 440(15)-440(0).

A controller 450 within the DFU 170 writes the address of the relevant line, as well as sets any of the hazard indication bits whenever it decides to fetch a BDU. Once the fetch operation of a certain BDU ends the associated hazard indication bit is reset.

Assuming that the processor 110 applies a write allocate policy, a BDU can be written by the processor 110 only if that BDU is valid. Thus, if the processor 110 writes to a non-valid BDU the data cache module 200 first reads the data from the high-level memory module 50 and just then writes the updated data to the valid BDU.

The controller 450 receives the address of each BDU that is being written to the cache, as well as corresponding valid bits from the cache logic 210 and is aware of the BDUs that are being fetched. Accordingly, it can set an appropriate hazard indication bit and prevent fetch operations to BDUs that are associated with a set hazard indication bits.

According to an embodiment of the invention the length of the hazard indication register 440 is proportional to the amount of BDUs that are subjected to fetch operations. The amount of hazard indication bits can be responsive to a length of fetch bursts. A BDU that is being fetched is a BDU that the data channel 130 or one of its components decided to fetch, but the fetching process did not end. The process ends once the DBU is written to the cache memory.

The hazard indication mechanism is implemented in addition to the dirty bit mechanism that prevents fetching BDUs that are scheduled to be sent to the high-level memory module 50 through WBB 180.

Figure 8:
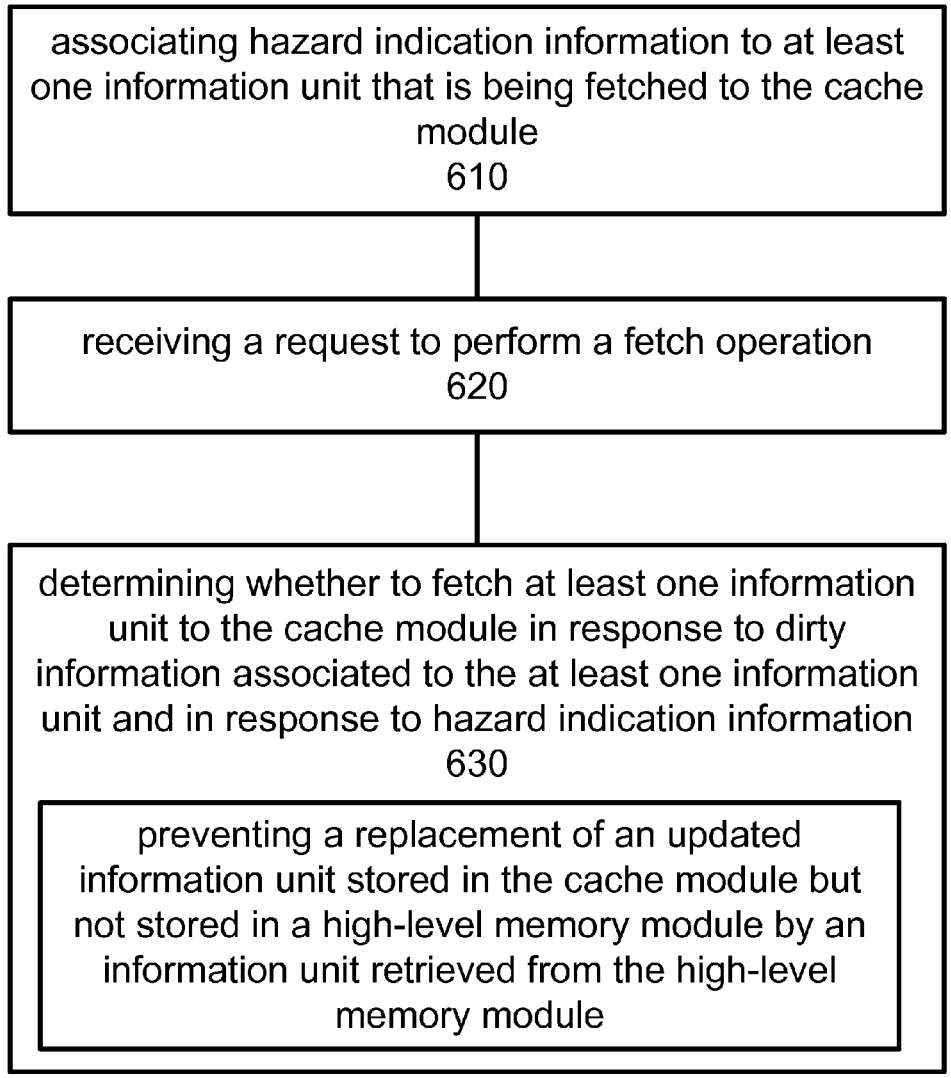
FIG. 8 is a flow chart of a method for fetching information in response to hazard indication information, according to an embodiment of the invention.

FIG. 8 is a flow chart of a method 600 for fetching information in response to hazard indication information, according to an embodiment of the invention. Method 600 starts by stage 610 of associating hazard indication information to at least one information unit that is being fetched to the cache module. Referring to the example set forth in FIG. 7, the controller 450 determines the content of the hazard indication register 440.

Stage 610 is followed by stage 620 of receiving a request to perform a fetch operation. Referring to the previous example, the request can be a mandatory fetch request resulting from a cache miss event or can be a speculative fetch operation request generated by the DFU 170 itself.

Stage 620 is followed by stage 630 of determining whether to fetch at least one information unit to the cache module in response to dirty information associated to the at least one information unit and in response to hazard indication information. Referring to the previous example, dirty bit mechanism prevents fetching BDUs that were updated by the processor 110 but did not complete their write back process. The hazard indication information prevents a scenario in which a non-dirty BDU is updated by the processor 110 but does not reside in the high-level memory module 50 and there is a request to fetch that BDU from the high-level memory module.

TABLE 1 illustrates various signals and commands that can result in a hazardous situation:

| # | Operation | A | B | C | D | E | F | G | H |
|---|---|---|---|---|---|---|---|---|---|
| T1 | Read C - Cache miss- Mandatory fetch of C | | | M | | | | | |
| T2 | Initiate speculative fetch sequence of C–H. | | | | | S | | | |
| T3 | Speculative fetch of F | | | | | | S | | |
| T4 | Initiate write-through of G | | | | | | | S | IWT |
| T5 | Hazard - conflict between pre-fetch of G and non-completed write-through operation of G | | | | | | | X | |

The letters A-H denote six BDUs that belong to a certain cache line. It is assumed that the third till seventh BDUs represented by C-G are valid as a result of fetch operations that are not represented in TABLE 1.

At a first clock cycle T1 processor 110 decided to read the third BDU (denoted by C) of a certain line. A cache miss event occurs and the DFU 170 performs a mandatory fetch operation and fetches the third BDU, as indicated by the letter M that is written at the first row.

At another clock cycle (T2) the DFU 170 initialized a sequence of speculative fetch operations for fetching the fourth till seventh BDUs of that certain cache line. During that clock cycle the fourth BDU (denoted by D) is speculatively fetched, as indicated by the letter S that is written at the second row.

During the third clock cycle (T3) a speculative fetch operation of the fifth BDU (denoted by E) is completed, as illustrated by the letter S that appears at the third row of the table.

At the fourth clock cycle (T4) the processor 110 initializes a write through process to the seventh BUD (Denoted by G), as illustrated by the letters "IWT" appearing at the fourth row of the table, and a speculative fetch operation of the sixth BDU (denoted by F) is completed, as illustrated by the letter S appearing at that forth row. It is assumed that for various reasons, such as but not limited to the depth of the WTB 155, arbitration of bus requests by the DCU 150 that the write beck is not completed during at least the forth and fifth clock cycles. It is noted that as G was written to the WTB 155 its dirty bit is not set.

At the fifth clock cycle (T5) a hazard may occur as a speculative fetch operation for fetching the seventh BDU is schedule to occur. This fetch operation will fetch a non-updated seventh BDU, as the updated seventh BDU is stored at the WTB 155 and did not reach the high-level memory module 50 from which the fetch operation should take place. This possible hazard is represented by the letter X. This hazard is prevented as the hazard indication logic 430 will prevent the speculative fetch operation to be executed.

Figure 9:
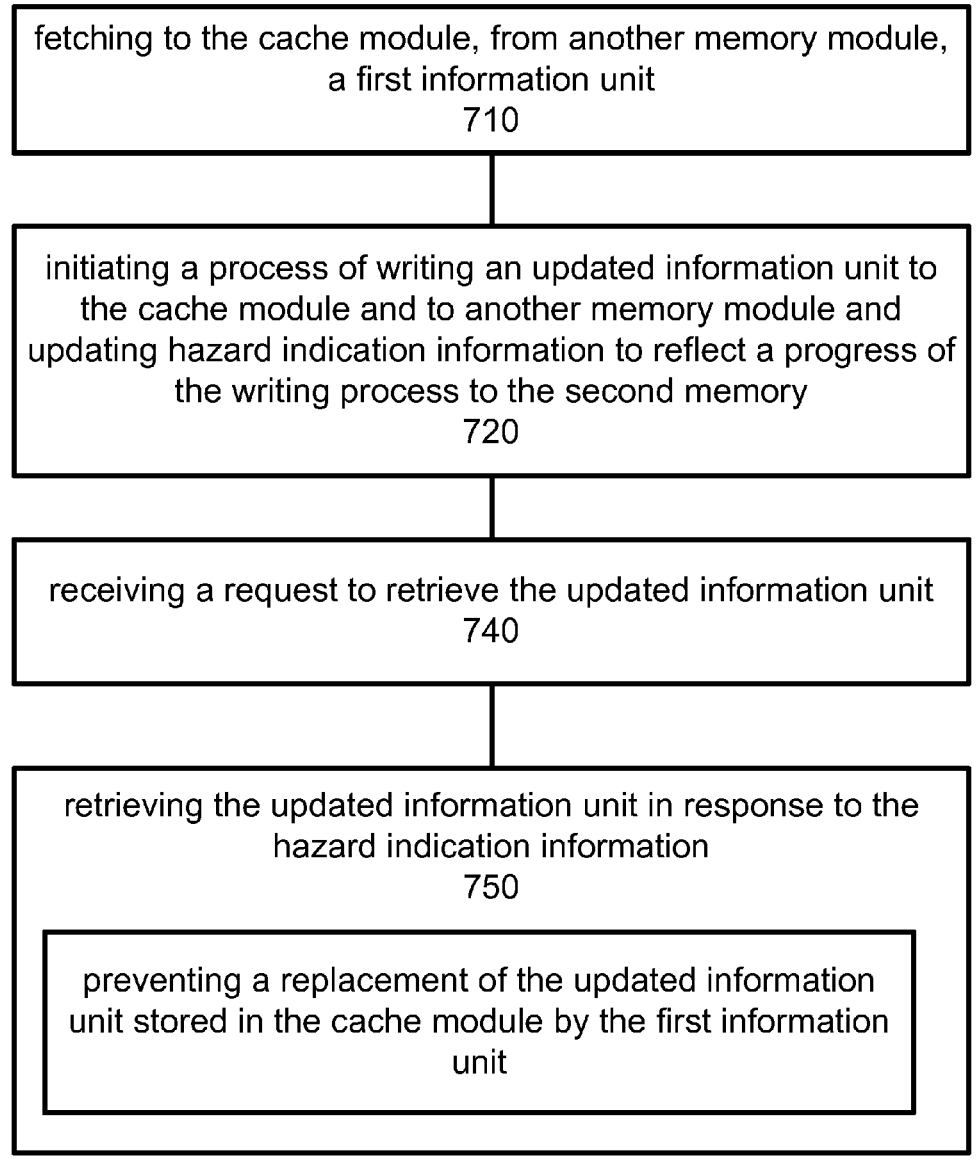
FIG. 9 is a flow chart of a method for fetching information in response to hazard indication information, according to an embodiment of the invention.

FIG. 9 is a flow chart of a method 700 for fetching information in response to hazard indication information, according to another embodiment of the invention.

Method 700 starts by stage 710 of fetching to the cache module, from another memory module, a first information unit. The fetching operation can be either a speculative or mandatory fetch operation.

Stage 710 is followed by stage 720 of initiating a process of writing an updated information unit to the cache module and to another memory module and updating hazard indication information to reflect a progress of the writing process to the second memory. Referring to the example set forth in FIG. 2 and in FIG. 7, a BDU can be sent to the data cache module 200 and to the WTB 155. If a write allocate policy is applied it is assumed that that the BDU is valid. In response—the hazard indication logic 430 updates the content of the hazard logic register 440.

Stage 720 is followed by stage 740 of receiving a request to retrieve the updated information unit. Referring to the example set forth in FIG. 2, this request can be a speculative fetch request initiated by DFU 170.

Stage 740 is followed by stage 750 of retrieving the updated information unit in response to the hazard indication information. Referring to the example set forth in FIG. 7 the hazard indication logic 440 can prevent a speculative fetch if the updated BDU is still stored at WTB 155.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for fetching information in response to hazard indication information, the method comprises:
   associating hazard indication information with at least one information unit that is being fetched to a cache module;
   receiving a request to perform a fetch operation; and
   determining whether to fetch the at least one information unit that is requested for fetching in the request to perform the fetch operation, wherein the determining is carried out in response to the hazard indication information and in response to dirty information associated with the at least one information unit; wherein the determining comprises preventing a replacement of an updated information unit stored in the cache module but not stored in a high-level memory module by an information unit retrieved from the high-level memory module.

2. The method of claim 1 wherein the stage of associating comprises storing address information of at least one information unit that is being fetched.

3. The method of claim 2 wherein the stage of determining comprises comparing the stored address information to address information associated with the received request to perform a fetch operation.

4. The method of claim 1 wherein the stage of associating comprises allocating a hazard indication register for each cache line that comprises an information unit that is being fetched, wherein the hazard indication register has a first portion that stores an address of the cache line, and a second portion for storing multiple hazard indication bits, each associated with a single information unit of the cache line.

5. The method of claim 1 wherein the fetch operation comprises a speculative fetch operation.

6. The method of claim 1 wherein the fetch operation comprises fetching at least one information unit from another memory module.

7. The method of claim 1 wherein multiple information units are fetched in fetch bursts.

8. The method of claim 1 wherein speculative information units associated with different mandatory information units are fetched in an interlaced manner.

9. The method of claim 1 wherein the stage of associating comprising assigning at least one hazard indication bit to each information unit that is being fetched.

10. A method for fetching information in response to hazard indication information, the method comprising the stages of:
    fetching to a cache module, from a memory module that is not the cache module, a first information unit;
    initiating a process of writing an updated information unit to the cache module and to another memory module and updating hazard indication information to reflect a progress of the writing process to the other memory module;
    receiving a request to retrieve the updated information unit; and
    retrieving the updated information unit in response to the hazard indication information; wherein the retrieving comprises preventing a replacement of the updated information unit stored in the cache module by the first information unit.

11. The method of claim 10 wherein the hazard indication information is associated with address information of at least one information unit that is being fetched.

12. The method of claim 11 wherein the stage of retrieving is responsive to a comparison between the stored address information to address information associated of the updated information unit.

13. The method of claim 10 wherein the stage of updating is preceded by a stage of allocating a hazard indication register for each cache line that comprises an information unit that is being fetched, wherein the hazard indication register has a first portion that stores an address of the cache line, and a second portion for storing multiple hazard indication bits, each associated with a single information unit of the cache line.

14. The method of claim 10 wherein the fetch operation comprises a speculative fetch operation.

15. The method of claim 10 wherein the fetch operation comprises fetching at least one information unit from another memory module.

16. The method of claim 10 wherein multiple information units are fetched in fetch bursts.

17. The method of claim 10 wherein speculative information units associated with different mandatory information units are fetched in an interlaced manner.

18. An apparatus for fetching information in response to hazard indication information, the apparatus comprises:
a cache module;
hazard indication logic for associating hazard indication information to at least one information unit that is being fetched to the cache module; and
a controller, coupled to the hazard information logic and to the cache module, for determining whether to initiate a fetch operation for at least one information unit that is requested for fetching in a request to perform the fetch operation, wherein the controller is configured to determine whether to initiate the fetch operation in response to the hazard indication information and in response to dirty information associated with the at least one information unit; wherein the controller is adapted to prevent a replacement of an updated information unit stored in the cache module by a corresponding non-updated information unit being fetched to the cache module.

19. The apparatus of claim 18 wherein the controller is further responsive to cache miss events.

20. The apparatus of claim 18 wherein the controller is adapted to determine to initialize speculative fetch operations.

21. The apparatus of claim 18 wherein the hazard indication logic comprises at least one hazard indication register, wherein the hazard indication register has a first portion that stores an address of the cache line, and a second portion for storing multiple hazard indication bits, each associated with a single information unit of the cache line.

22. The apparatus of claim 18 wherein the hazard indication register comprises multiple hazard indication registers, each associated with a cache line that comprises at least one information unit that is being fetched, wherein each hazard indication register has a first portion that stores an address of the cache line, and a second portion for storing multiple hazard indication bits, each associated with a single information unit of the cache line.

\* \* \* \* \*